US012809925B2

(12) United States Patent
Van Wie et al.

(10) Patent No.: US 12,809,925 B2
(45) Date of Patent: Nov. 24, 2026

(54) MACHINE LEARNING TECHNIQUES FOR IMPROVED CONTENT GENERATION

(71) Applicants: David Van Wie, Palo Alto, CA (US); Michele Moreland, Penn Valley, CA (US); Mitchell McKenna, Palo Alto, CA (US); Christopher Lee, Eugene, OR (US); Marco Doerr, Austin, TX (US)

(72) Inventors: David Van Wie, Palo Alto, CA (US); Michele Moreland, Penn Valley, CA (US); Mitchell McKenna, Palo Alto, CA (US); Christopher Lee, Eugene, OR (US); Marco Doerr, Austin, TX (US)

(73) Assignees: David Van Wie, Palo Alto, CA (US); Michele Moreland, Penn Valley, CA (US); Mitchell McKenna, Palo Alto, CA (US); Christopher Lee, Eugene, OR (US); Marco Doerr, Austin, TX (US)

( * ) Notice: Subject to any disclaimer, the term of this patent is extended or adjusted under 35 U.S.C. 154(b) by 0 days.

(21) Appl. No.: 19/319,674

(22) Filed: Sep. 4, 2025

(65) Prior Publication Data

US 2026/0064789 A1 Mar. 5, 2026

Related U.S. Application Data

(60) Provisional application No. 63/690,359, filed on Sep. 4, 2024.

(51) Int. Cl.
*G06N 3/00* (2023.01)
*G06F 16/00* (2019.01)
(Continued)

(52) U.S. Cl.
CPC .... *G06F 16/9535* (2019.01); *G06F 16/24573* (2019.01); *G06F 16/24578* (2019.01);
(Continued)

(58) Field of Classification Search
CPC ................ G06F 16/9535; G06F 16/35; G06F 16/24573; G06F 16/24578; G06F 16/93;
(Continued)

(56) References Cited

U.S. PATENT DOCUMENTS 10,235,453 B2 * 3/2019 Simard ................... G06F 16/35
11,934,792 B1 * 3/2024 Adato ..................... G06F 40/30
(Continued)

FOREIGN PATENT DOCUMENTS

WO WO 2019103912 A2 * 5/2019
WO WO 2020245754 A1 * 12/2020
(Continued)

OTHER PUBLICATIONS

Michelle M. H. Şeref et al., "Rhetoric Mining a New Text-Analytics Approach forQuantifying Persuasion", Informs Journal on Data Science, vol. 2, No. 1, Apr.-Jun. 2023, pp. 24-44.*
(Continued)

*Primary Examiner* — Srirama Channavajjala
(74) *Attorney, Agent, or Firm* — POLSINELLI LLP

(57) ABSTRACT

Techniques for content generation using machine learning. A device may access textual content from a user device associated with a user profile, access content preferences associated with the user profile, and provide the textual content to a classification model to identify one or more topics of the textual content. The classification model may be trained to identify topics within text. The device may access, from a content repository, supplementary textual content associated with the one or more topics; form, based on the content preferences, an instruction prompt for a
(Continued)

200

800 generative model; and provide the topics, the textual content, and the supplementary textual content to the generative model to obtain additional content. The device may identify, from the user profile, one or more additional user profiles having a relationship with the user profile; and provide the additional content to an external server.

19 Claims, 12 Drawing Sheets

(51) Int. Cl.

| | |
|---|---|
| ***G06F 16/2457*** | (2019.01) |
| ***G06F 16/35*** | (2019.01) |
| ***G06F 16/9535*** | (2019.01) |
| ***G06F 16/955*** | (2019.01) |
| ***G06F 40/30*** | (2020.01) |
| ***G06F 40/35*** | (2020.01) |
| ***G06F 40/40*** | (2020.01) |
| ***G06N 3/045*** | (2023.01) |
| ***G06N 3/047*** | (2023.01) |
| ***G06N 3/0475*** | (2023.01) |
| ***G06N 3/0499*** | (2023.01) |
| ***G06N 20/00*** | (2019.01) |
| *G06Q 10/40* | (2026.01) |

(52) U.S. Cl.
CPC .......... *G06F 16/35* (2019.01); *G06F 16/9558* (2019.01); *G06F 40/30* (2020.01); *G06F 40/35* (2020.01); *G06F 40/40* (2020.01); *G06N 3/045* (2023.01); *G06N 3/047* (2023.01); *G06N 3/0475* (2023.01); *G06N 3/0499* (2023.01); *G06N 20/00* (2019.01); *G06Q 10/40* (2026.01)

(58) Field of Classification Search
CPC ...... G06F 16/9558; G06F 40/30; G06F 40/35; G06F 40/40; G06N 20/00; G06N 20/10; G06N 3/045; G06N 3/09; G06N 3/0499; G06N 3/088; G06N 3/047; G06N 3/0475; G06Q 50/01; G06Q 10/10
See application file for complete search history.

(56) References Cited

U.S. PATENT DOCUMENTS

| | | | | |
|---|---|---|---|---|
| 11,995,180 | B1 * | 5/2024 | Cappel | G06F 21/55 |
| 12,332,841 | B1 * | 6/2025 | Hoagland | G06F 16/16 |
| 2005/0114198 | A1 * | 5/2005 | Koningstein | G06Q 30/0243<br>705/14.42 |
| 2007/0122347 | A1 * | 5/2007 | Statnikov | G16B 40/00<br>424/9.341 |
| 2008/0154883 | A1 * | 6/2008 | Chowdhury | G06F 3/0482<br>707/999.005 |
| 2012/0047219 | A1 * | 2/2012 | Feng | G06F 16/951<br>707/661 |
| 2013/0297691 | A1 * | 11/2013 | Collins | G06Q 50/01<br>709/204 |
| 2017/0124174 | A1 * | 5/2017 | Starr | G06F 16/353 |
| 2018/0018320 | A1 * | 1/2018 | Boyer | G06F 16/35 |
| 2019/0236134 | A1 * | 8/2019 | Galitsky | G06F 40/131 |
| 2020/0160229 | A1 * | 5/2020 | Atcheson | G06N 20/00 |
| 2020/0242195 | A1 * | 7/2020 | Souche | G06F 40/106 |
| 2021/0271823 | A1 * | 9/2021 | De Ridder | G06N 5/04 |
| 2023/0112740 | A1 * | 4/2023 | Alqaderi | G06F 40/58<br>704/9 |
| 2023/0297887 | A1 * | 9/2023 | Gurgu | G06N 20/00<br>706/12 |
| 2024/0046040 | A1 * | 2/2024 | Tobey | G06F 40/30 |
| 2024/0221725 | A1 * | 7/2024 | Poltorak | G10L 15/30 |
| 2024/0281668 | A1 * | 8/2024 | Lev | G06F 16/3344 |
| 2024/0289560 | A1 * | 8/2024 | Kelly | G06F 16/35 |
| 2024/0354503 | A1 * | 10/2024 | Baruch | G06F 16/345 |
| 2024/0364970 | A1 * | 10/2024 | Coskun | G06F 16/748 |
| 2024/0403623 | A1 * | 12/2024 | Mohamed Halim | G06N 3/044 |

FOREIGN PATENT DOCUMENTS

| | | | | |
|---|---|---|---|---|
| WO | WO 2021091573 | A1 * | 5/2021 | |
| WO | WO2022246162 | A1 * | 11/2022 | |

OTHER PUBLICATIONS

Ankita Agarwal et al., "An Exploration of the Effectiveness of Machine Learning Algorithms for Text Classification", 2023 IEEE International Conference on Paradigm Shift in Information Technologies with Innovative Applications in Global Scenario (ICPSITIAGS) Dec. 2023, pp.*

K. K. Ramachandran et al., "Deep Learning-based Topic-level Examination of Social Media", 2022 5th International Conference on Contemporary Computing and Informatics (IC31) (Dec. 2022, pp. 1684-1687).*

* cited by examiner

1000

MACHINE LEARNING TECHNIQUES FOR IMPROVED CONTENT GENERATION

CROSS-REFERENCE TO RELATED APPLICATIONS

The present application claims the benefit of U.S. Provisional Patent Application No. 63/690,359, filed Sep. 4, 2024, the contents of which is hereby incorporated for all purposes.

FIELD

The present disclosure relates to machine learning. In particular, and without limitation, disclosed techniques relate to using machine learning techniques for improved content generation and communication.

BACKGROUND

Machine learning systems or models can be used to perform a variety of tasks. For instance, generative machine learning systems can learn to understand and generate new data, enabling applications such as image generation, text generation, summarization, and translation.

SUMMARY

In some aspects, the techniques described herein relate to content generation. In some aspects, the techniques described herein relate to a method for generating content, including: accessing textual content from a user device associated with a user profile; accessing content preferences associated with the user profile; providing the textual content to a classification machine learning model to identify one or more topics of the textual content, wherein the classification machine learning model is trained to identify topics within text; accessing, from a content repository, supplementary textual content associated with the one or more topics; forming, based on the content preferences, an instruction prompt for a generative machine learning model; providing the topics, the textual content, and the supplementary textual content to the generative machine learning model to obtain additional content; identifying, from the user profile, one or more additional user profiles having a relationship with the user profile; and providing the additional content to an external server, wherein the additional content is associated with the one or more additional user profiles.

In some aspects, the techniques described herein relate to an apparatus for generating content, including: at least one memory; and at least one processor coupled to the at least one memory and configured to: access textual content from a user device associated with a user profile; access content preferences associated with the user profile; provide the textual content to a classification machine learning model to identify one or more topics of the textual content, wherein the classification machine learning model is trained to identify topics within text; access, from a content repository, supplementary textual content associated with the one or more topics; form, based on the content preferences, an instruction prompt for a generative machine learning model; provide the topics, the textual content, and the supplementary textual content to the generative machine learning model to obtain additional content; identify, from the user profile, one or more additional user profiles having a relationship with the user profile; and provide the additional content to an external server, wherein the additional content is associated with the one or more additional user profiles.

In some aspects, the techniques described herein relate to a non-transitory computer-readable medium is provided that has stored thereon instructions that, when executed by one or more processors, cause the one or more processors to: access textual content from a user device associated with a user profile; access content preferences associated with the user profile; provide the textual content to a classification machine learning model to identify one or more topics of the textual content, wherein the classification machine learning model is trained to identify topics within text; access, from a content repository, supplementary textual content associated with the one or more topics; form, based on the content preferences, an instruction prompt for a generative machine learning model; provide the topics, the textual content, and the supplementary textual content to the generative machine learning model to obtain additional content; identify, from the user profile, one or more additional user profiles having a relationship with the user profile; and provide the additional content to an external server, wherein the additional content is associated with the one or more additional user profiles.

Various embodiments of the disclosure are discussed in detail below. While specific implementations are discussed, this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Figure 1:
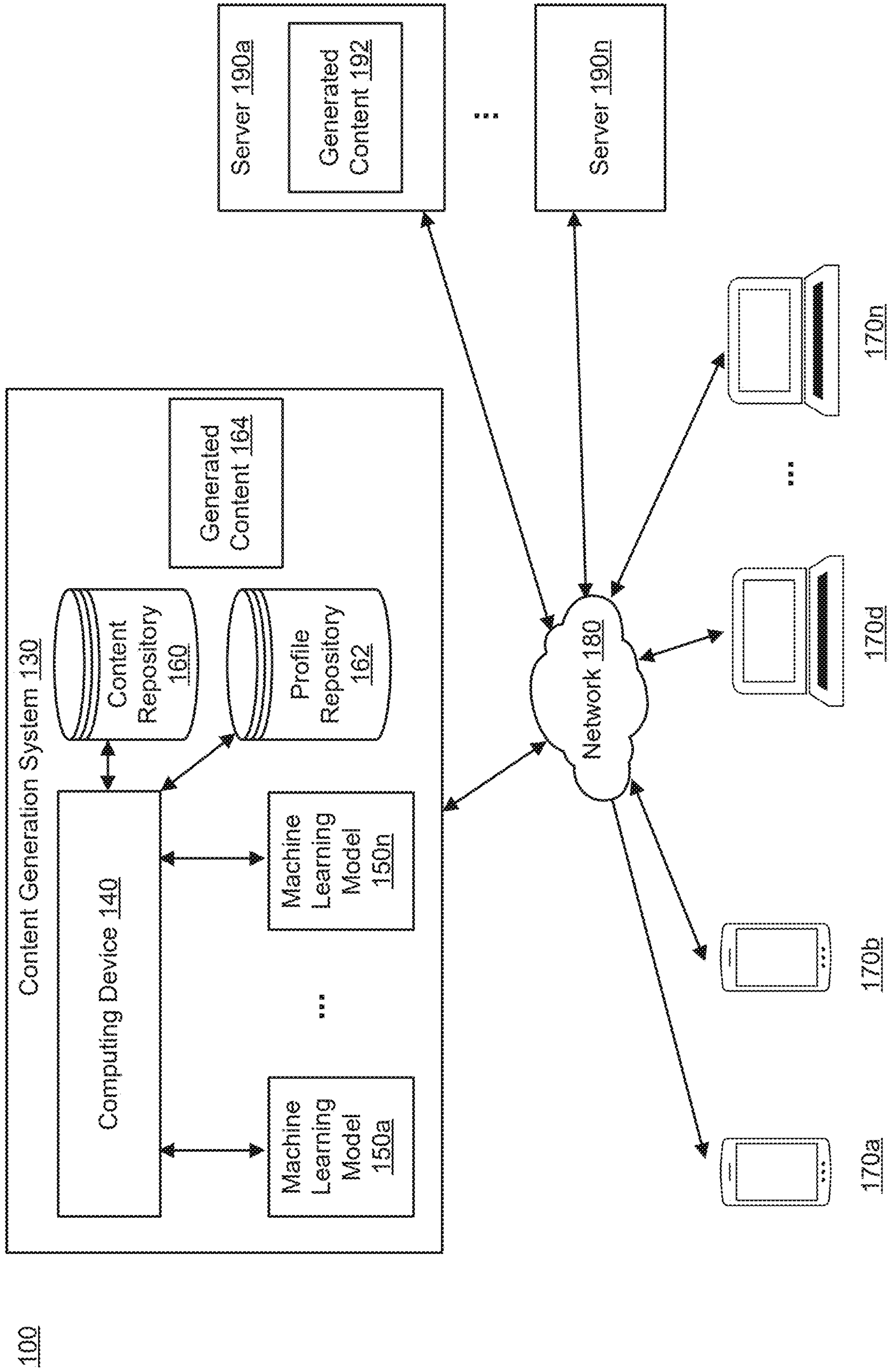
FIG. 1 depicts an example of an environment for generating and communicating content, in accordance with an aspect of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed techniques relate to using machine learning techniques for improved content generation and communication. For example, certain aspects involve a machine-learning based content generation system that generates content based on personalized content preferences such as desired style, tone, audience, and/or objective. The generated content may be derived from initial content provided by a user device and augmented by custom-generated content that is topically aligned with the initial content.

To generate the custom content, the content generation system may leverage machine learning. For instance, classification models may be used to identify relevant topics within the initial content and generative models may be used to prepare the generated content. As explained below, the generative models may employ advanced prompt engineering, including automatically-generated prompts that are formed in part based on the content preferences and/or performance analytics. The generated content may be automatically shared with a curated network of user devices and/or other services.

The following non-limiting example is introduced for discussion purposes. A user device (e.g., mobile phone, laptop) interacts with a content generation system via a specialized user interface and/or an autonomous agent (e.g., an agentic AI agent) to manage content. The user device makes an initial content item available to the content generation system, for example, by linking to the initial content item. Non-limiting examples of the initial content item include a news article, blog post, and a social media post. The initial content item may be directed to a topic or subject matter that interests a user operating the user device.

The content generation system then provides the content item to a classification model, which identifies various topics or keywords represented within the initial content item. Exemplary topics include "science," "law," "arts," "politics," and "justice." Sub-topics are also possible, as explained below. As used herein, a "topic" includes one or more "sub-topics" or any component thereof. The content generation system then uses these identified topics to access additional curated content, for example, from a content repository. Examples of additional relevant content include additional articles, news stories, posts, summaries, and so forth. The additional content is topically aligned with the initial content.

Continuing the example, the user device continues to interact with the content generation system to configure the generation and/or communication of the content by specifying content preferences. Non-limiting examples of content preferences that may be adjusted include style, tone, audience, and/or objective. A user device may also configure a destination of the content, for example, a particular content server. Based on the configuration, the system generates an additional content item that meets the content preferences and any other requirements by using a generative machine learning model. As discussed in more detail, the system may customize an instruction prompt for the generative model. The custom prompt may be derived from the content preferences and/or various analytics such as metrics that indicate performance of similar content. The additional content item is shared with the user device for review and may be automatically shared with a group or network of like-minded users who share an interest in the topic reflected in the content, thereby augmenting the analytic performance of the content.

Technical advantages of certain aspects include, but are not limited to, improved prompt engineering. For instance, certain aspects generate more effective instruction prompts for machine learning models. These improved prompts result in improved outputs from machine learning solutions without requiring user intervention. As discussed below, analytics gathered during execution of the content generation system may be fed back into revised and/or improved prompts such that improvements are propagated through the system. The prompts may therefore be dynamically generated to obtain improved results from the model.

Turning now to the Figures, FIG. 1 depicts an example of an environment 100 for generating and communicating content, in accordance with an aspect of the present disclosure. In the example depicted by environment 100, one or more user devices 170*a-n* interact with content generation system 130 via communication network 180 to generate content 164 and to optionally facilitate the availability of the generated content 164 available as content 192 on one or more servers 190*a*-190*n*.

Content generation system 130 is configurable to analyze content and generate additional content therefrom using one or more machine learning models 150*a*-150*n*. Content generation system 130 may include computing system 140, machine learning models 150*a*-150*n*, content repository 160, and profile repository 162. Content generation system 130 may include additional functional components such as those discussed further with respect to FIG. 2.

Environment 100 can include one or more user devices 170*a*-170*n*. As depicted, user devices user devices 170*a-n* include handheld devices such as phones and tablets (e.g., 170*a*, 170*b*) and computing devices such as portable computers 170*d*-170*n*, or other devices that allow users to interact with the system such as smart speakers, glasses, lapel or belt mounted digital audio systems or headsets. In an example, the user devices 170*a*-170*n* may operate a mobile or desktop application (an "app"). The application may be available for download via one or more application stores. In some cases, a user may register for an account, e.g. via a mobile application, and in so doing may create or join one or more groups.

In one example, software executing on a user device such as an application may interact with content generation system 130 via an Application Programming Interface (API). Content generation system 130 may be hosted on a web-based server and be accessible by any device via a web browser. Network 180 represents a private network or a public network such as the internet. Servers 190*a*-190*n* are servers that host content, such as social media networks, content networks, and so forth.

Content generation system 130 may include one or more repositories such as content repository 160 and/or profile repository 162. Content repository 160 may store content items such as news articles, stories, videos, editorials, online reviews, research databases and so forth; and/or content generated by computing system 140, such as content generated by a generative model. The content items may be topically organized or tagged. For instance, content items may be placed within the content repository 160 and be organized by or tagged with one or more keywords that represent topics.

For instance, a first content item may be tagged with the keyword "rights" and a second content item may be tagged with the keyword "laws." In some cases, content items may be tagged with two or more keywords. For example, a content item relating to "justice" may also be tagged with the keywords "law" and "courts." A content item may therefore be retrieved by the content generation system 130 by searching the content repository 160 for a particular keyword.

Profile repository 162 may include user profiles of users accessing the services hosted by content generation system 130 (for example, operating the user devices 170*a-n*). The users may be grouped, or otherwise related to each other. Group profiles may be included in the profile repository. Examples of user profiles and groupings are discussed further with respect to FIG. 3.

Figure 4:
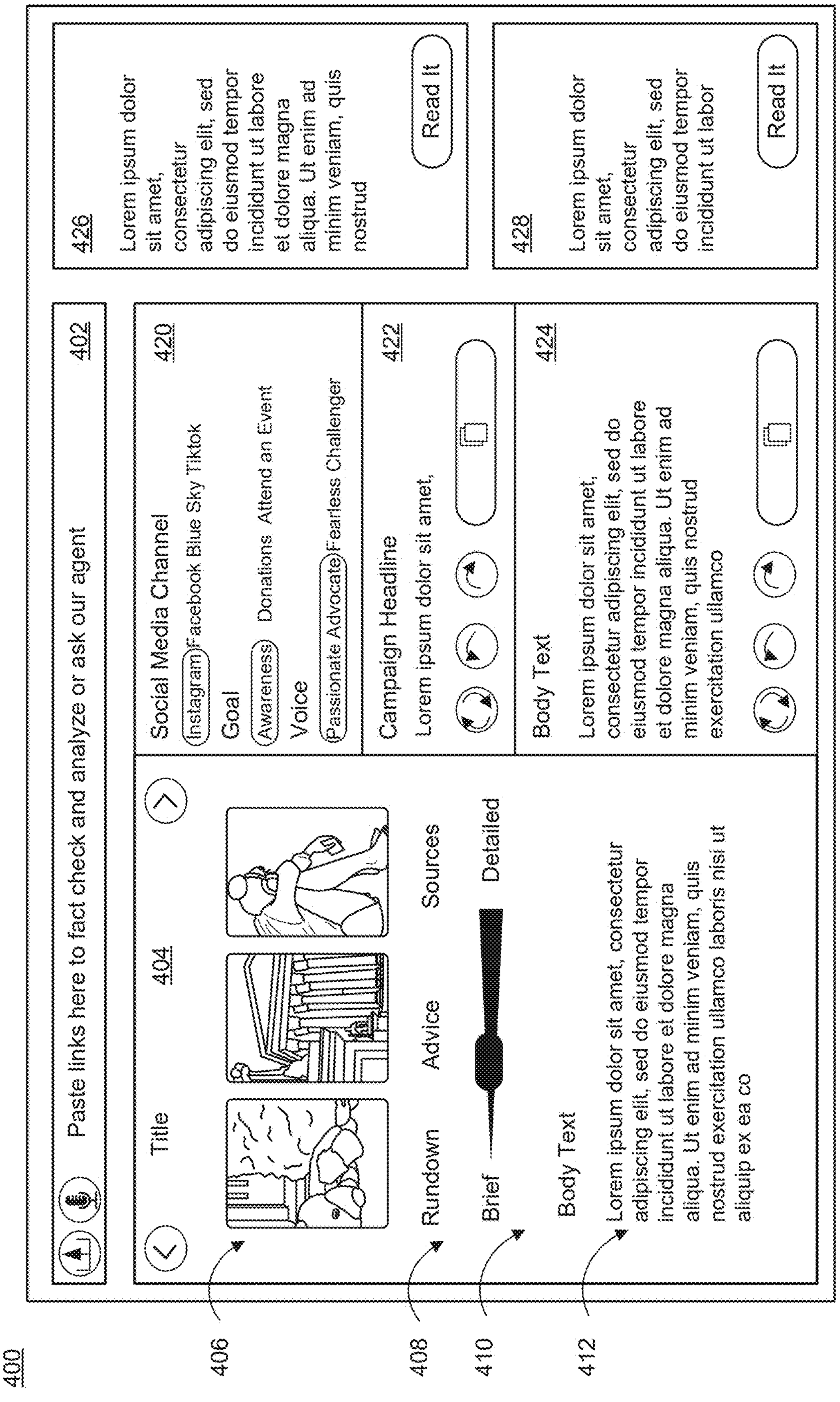
FIG. 4 depicts an example of a user interface used for generating and communicating content, in accordance with an aspect of the present disclosure.
Figure 9:
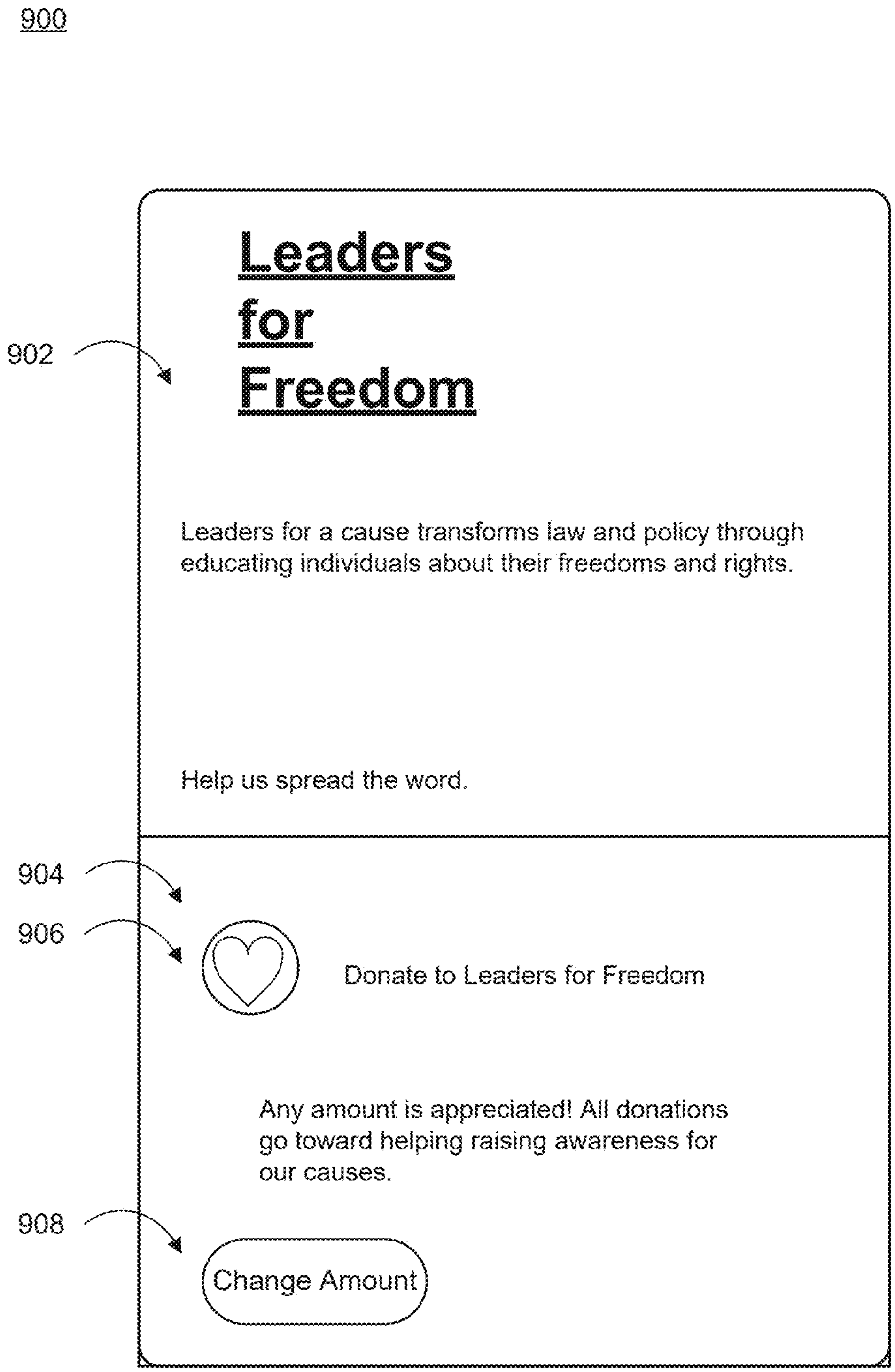
FIGS. 9-10 depict examples of user interfaces for use with generating and communicating content, in accordance with an aspect of the present disclosure.
Figure 10:
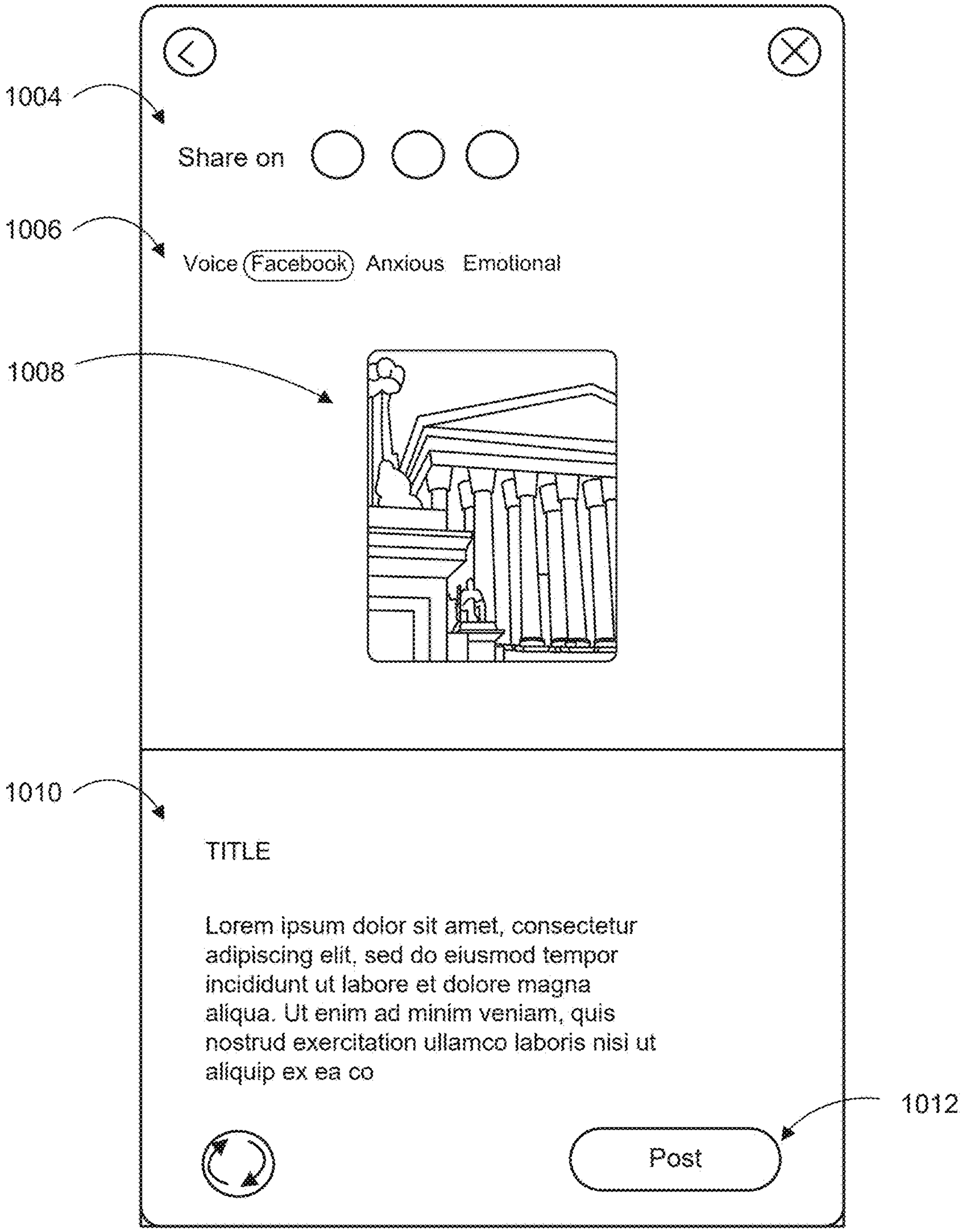

In some aspects, content generation system 130 may be controlled via a user interface such as the user interface discussed further with respect to FIG. 4, 9, or 10. For instance, a user device may upload, manage, and/or communicate content via a user interface. In other aspects, content generation system 130 may be interacted with and/or controlled by an autonomous agent, an example of which is discussed further with respect to FIG. 5. For instance, a user may interact with the autonomous agent to provide instructions and/or feedback such that the agent causes the system to generate and/or communicate the desired content.

As discussed, certain aspects involve machine learning. Machine learning models 150*a-n* may include various machine learning models such as classification models (classifiers). Classification models are a type of machine learning algorithm used to predict categorical outcomes (i.e., class labels). Non-limiting examples of classification models include logistic regression models, decision trees, random forests, Support Vector Machines (SVMs), K-Nearest Neighbors (KNNs), and neural networks or deep learning models.

Machine learning models 150*a-n* may include generative models. Generative models are machine learning models that learn the underlying distribution of data and can generate new data samples similar to those in the training set. Generative models may be used for tasks such as image generation, text generation, data synthesis, and more. Examples include Gaussian Mixture Models (GMM), Variational Autoencoders (VAEs), Generative Adversarial Networks (GANs), diffusion models and language models such as large language models (LLMs) or small language models. In an aspect, a small language model may provide faster training and/or updating of model parameters.

In an aspect, a first machine learning model 150*a* is a classification model trained to generate keywords from content, and a second machine learning model 150*b* is a generative machine learning model trained to generate content from input keywords, and/or input content. Such a configuration is discussed further with respect to FIG. 6. Certain aspects involve engineering of custom instruction prompts. An example of a custom prompt is discussed with respect to FIG. 7. Machine learning models may be trained. An example of a training approach for a model is discussed further with respect to FIG. 11.

In some cases, to control an output of the generative model, computing system 140 may generate a custom instruction prompt ("prompt'). An instruction prompt is an input or instruction given a language model to obtain a result and may include a question or an instruction. A series of prompts may be organized into a pipeline in order to generate the final desired output. As explained further herein, a prompt may include different components, each of which may be generated based on analytics, topics or keywords. An example of prompt generation is discussed further with respect to FIG. 7.

Figure 12:
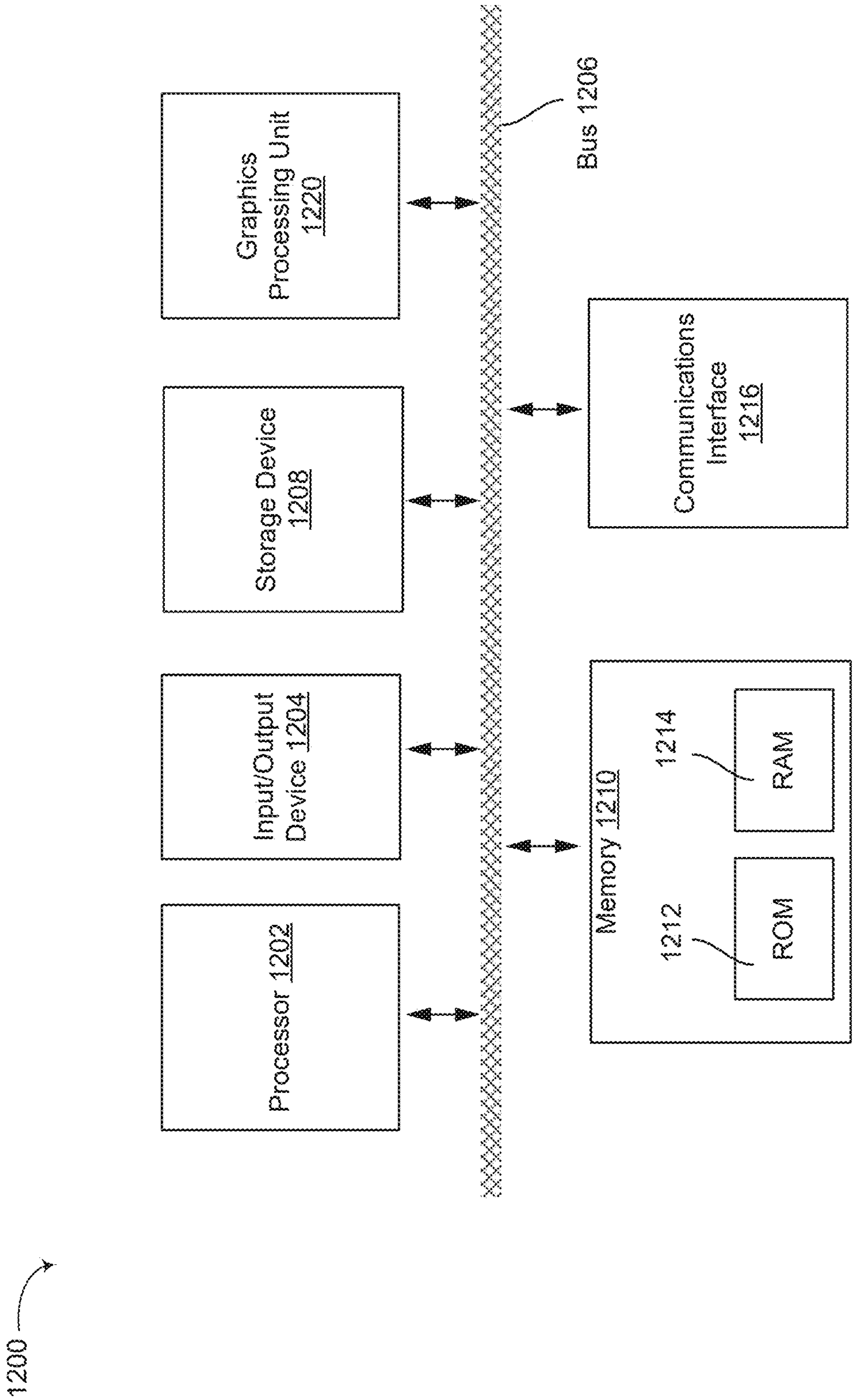
FIG. 12 is a diagram illustrating an example of a computer system, in accordance with an aspect of the present disclosure.

An example of computing system 140 is discussed further with respect to FIG. 12. Computing system 140 may include one or more processors, such as general purpose processors, graphics processors, specialized hardware, and so forth.

As discussed, certain aspects relate to generating content. In some cases, generated content may be referred to "content messages." A content message refers to generated content that is targeted to a particular objective. Content messages may be generated individually or organized into campaigns of multiple messages. The objective may be associated with a user and/or a group of users, as discussed below. In some cases, an objective may include a "call to action" associated with a particular cause such as a marketing campaign, fundraising project, political cause, social cause, etc. As explained below, disclosed techniques can improve a success rate of a messaging campaign focused on an objective.

As discussed, a content message may be associated with one or more topics. Different topics are possible. Topics and sub-topics may be organized in a hierarchy. The depth of the hierarchy is determined by the granularity needed for content classification and alliance formation, and so on. Non-limiting examples of topics include history, science, mathematics, English literature, law, civil rights, foreign affairs, immigration, inequality, the environment, healthcare, income inequality, climate change, crime, drug policy, and so forth. Any topic may have one or more sub-topics. For example, a topic related to "immigration" may have sub-topics "undocumented immigration" or "work visas." In another example, the topic "healthcare" may include topics such as "children's healthcare" and "health insurance." Another example of a topic is "2026 Company Marketing Plan" and a sub-topic may be "2026 Department Marketing Plan" with a further sub-topic of "Department Sales Plan." Topics may be divided into sub-topics (and sub-sub-topics, etc.) on a hierarchical basis. A hierarchy of topics may be used interchangeably with topics, as discussed herein.

A given topic may facilitate a connection between users and/or groups of users. For instance, a given group of users may have a shared interest in one or more topics. As discussed, a user device may register with the content generation system. A user may indicate any topics that are relevant to their interests at registration time or later in the process. In one example, a user registers with the content generation system and chooses to create a new group associated with a given topic. This user may be referred to as a "pioneer user," as the user creates a new group with a given topic, and the resulting group as a "pioneer group." After creating a group, a user may send one or more messages to other users of the group announcing the creation of the group.

In another example, a user registering with the content generation system may choose to join a group associated with a given topic, for example, from a list or database of available topics. This process can be referred to as "discovery," as the user may discover which users are associated with a given topic already. For example, a user may register with the content generation system. After registration, the user may be presented with a list of existing group and associated topics and/or sub-topics. The user may learn more about each group and/or select one or more groups to join. After joining, the user may participate in group activities. In yet another example, a user may create or be associated with a sub-topic of a particular topic. In an aspect, the vocabulary (topic, sub-topic) may be defined by a user and agreed upon.

In some cases, relationships between users and/or groups may be governed by one or more rules. For instance, one or more rules may govern relationships (e.g. operations, leadership, decision-making) between users within a group and/or between groups. The rules may govern, among other things, sharing of message content and/or financial proceeds. For example, a group of users may decide to take collective action, including but not limited to automatically "liking" and "resharing" another member's post of a generated content message. Groups may form "alliance memberships" with other groups that govern how content messages and/or financial proceeds are managed between them. In this manner, like-minded groups may expand a scope of their collective action to other groups, potentially reaching many groups either through direct alliances or the daisy chaining of alliances.

Content messages may be designed to educate others, share important information, and/or include a call to action. For example, content messages may request that a recipient make a donation, attend an event, join an organization, purchase a product or service, or transmit a content message outside the network. A content message may include embedded information, such as a Uniform Resource Locator (URL) or a Quick Response (QR) code that enables a financial transaction to be easily made and/or other actions to be undertaken.

Additional advantages relative to existing solutions include increasing the quality of generated content by decomposing more complex tasks into smaller increments; using a structured output specification to assist such generation; the ability to easily experiment with different options for generating content; distributing generated content through the collective action of a group of users; engaging with or customize such content automatically for a group of users; further amplifying a distribution of generated content by allowing groups with shared topical interests to distribute, engage with, or customize other groups' generated content; collect and flexibly distribute funds to users, groups, collections of groups or third parties; integrating new content with existing content to improve the accuracy and scope of generated content; and users being able join discover users and/or groups already associated with a given topic or sub-topic.

Figure 2:
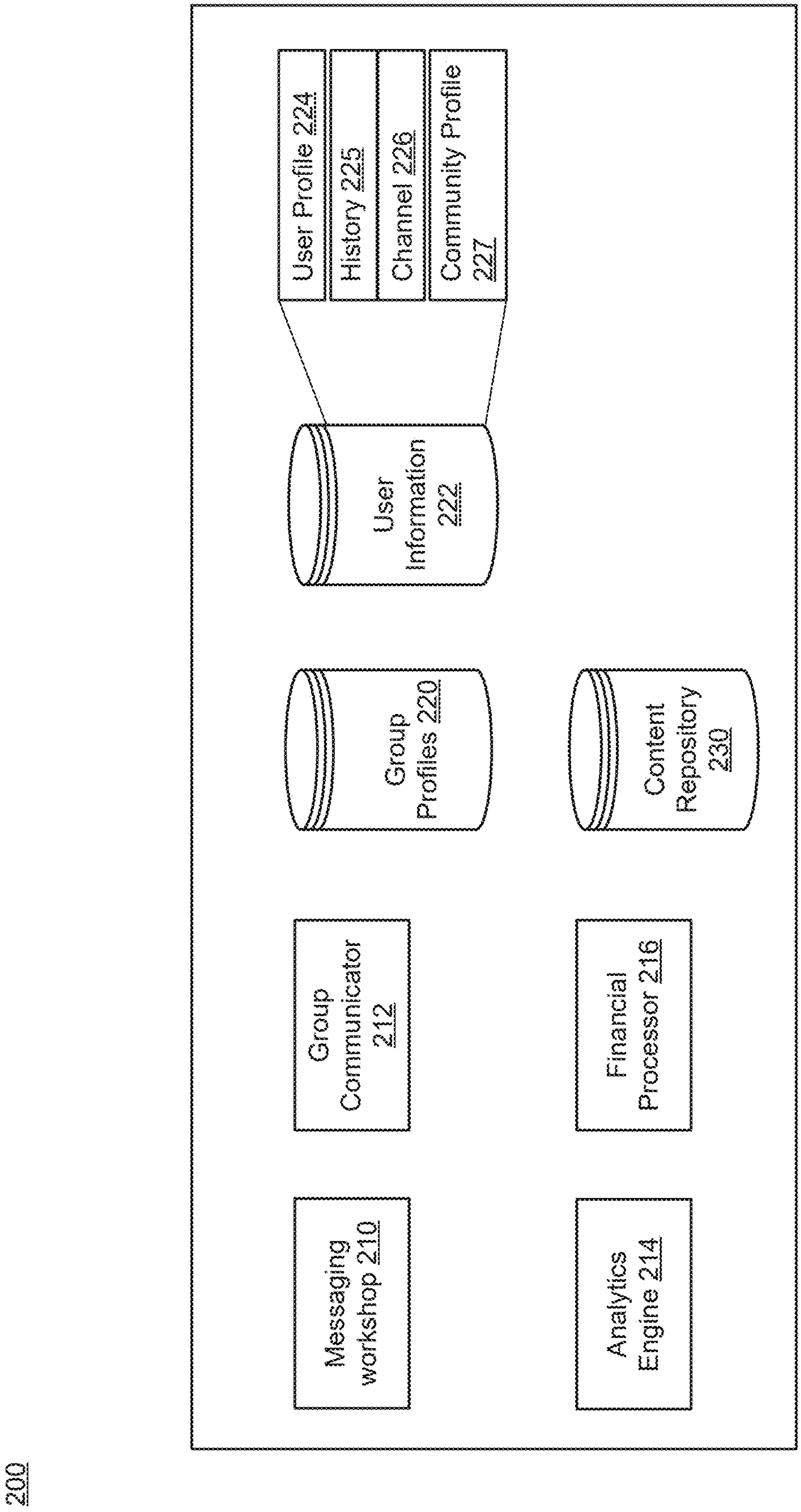
FIG. 2 depicts an example of a system for generating and communicating content, in accordance with an aspect of the present disclosure.

FIG. 2 depicts an example of a system 200 for generating and communicating content, in accordance with an aspect of the present disclosure. One or more user devices (e.g., user devices 170*a-n*) may interact, for example, via messaging and/or a user interface, with one or more components of system 200 to generate and communicate content.

System 200 includes more functional modules including messaging workshop 210, group communicator 212, analytics engine 214, and/or financial processor 216. These functional modules may be implemented in hardware and/or software and may execute on one or more of user devices 170*a-n*, content generation system 130, and/or one or more servers 190*a*-190*n*. In some cases, these functional modules leverage machine learning techniques.

Messaging workshop 210 may operate various messaging services such as generating and processing messages to or from one or more devices. For instance, messaging workshop 210 may include a front end that interacts with user devices 170*a*-170*n*. Functionality includes processing user messages from a user device to determine a user intent (e.g., what the user wants the agent to do) and/or generating messages in response to the user messages. Messaging workshop 210 may leverage machine learning models such as large language models, generative models, and classification models.

Messaging workshop 210 may further include a back end that creates content (e.g., content messages) and runs a workflow of content generation. For example, the backend may manage one or more machine learning models to generate and/or curate content and to compose content messages to be transmitted to one or more of servers 190*a*-190*n*. In another example, a user may use the messaging workshop to reword a content message (e.g., a post) into another user's voice before posting via other channels.

Group communicator 212 allows members of a group to communicate with one another by text, voice, video and screen sharing and develop content messages as a group. In this manner, a user need not use an external messaging application for communications. In an example, a group of users may decide to take collective action via agreement, such as automatically engaging with other users' content messages on social media channels and/or regenerating such content messages in accordance with each user's profile information. Groups may have internal governance rules such as adding or removing members (users), managing alliances, and managing financial distributions. Different groups may have different sets of rules.

Group communicator 212 may also facilitate sharing of content messages with other groups based on rules established between users and/or groups. For instance, alliance memberships may form a basis of sharing rules. For example, if two or more groups of users are in an alliance, then content messages generated by the first group may be shared automatically with the second group for further modification and/or distribution, and vice versa. The alliance rules may indicate, for example, that two or more groups may share content associated with a first topic but not with other topics, or that financial proceeds received by one group will be shared with another group or groups based on agreed rules. The alliance rules may have internal governance rules such as adding or removing members (users), managing alliances, and managing financial distributions. Different alliances may have different sets of rules.

Analytics engine 214 monitors activity within the messaging workshop, each group and alliance. This activity data is used to assess activity levels and choices that users are making within the messaging workshop with respect to different topics, messages and messaging campaigns. The analytics engine also tracks responses to content messages that incorporate a call to action to help determine the effectiveness of particular messages, including but not limited to different audience segment response rates, the effectiveness over time and the implied effectiveness of the prompts that generated such messages.

As discussed above, topics may be identified within messages as a means of identifying messages subject to the alliance sharing rules. Some content messages have an objective, e.g., a call to action, to make a donation, attend an event, join an organization, or send a message. These calls to action include information (such as a URL or a QR code) used to connect to the content generation system, e.g. financial processor 216. The analytics engine 214 also monitors this stream to measure the effectiveness of different message wording, message organization, messaging campaign mechanics, user profiles and other details. This information can be used to both monitor activity and to automatically refine content messaging strategies and word choices as well as other aspects of prompt generation and message refinement including pipeline adjustments.

The analytics engine 214 can track the evolution of responses to generated content over time as well as the responses from different demographic groups to the same message. The analytics engine 214 allows the prompt generation process to evolve both in terms of prompt wording and structure, as well as pipelining.

Financial processor 216 may facilitate one or more financial transactions. For example, when a content message involves a call for a financial transaction, the transaction may be handled by a financial processor. Non-limiting examples of financial transactions include donations, crowd funding, payments or transfers (e.g., between users and/or groups), sales (e.g., product or service sales).

The financial processor 216 may establish financial accounts for users and/or groups. These accounts may be used to transfer funds. Funds may be transferred internally, e.g., to and from bank accounts held by users and/or groups, and/or externally, e.g., to or from other entities. Funds in these accounts may also be used for donations and purchases within the network.

Funds may be distributed based on one or more distribution rules. Some distribution rules allow transaction proceeds to be automatically distributed. For example, funds may be distributed to members of a group, funds may be placed into the group's account, funds may be shared with other groups through the alliance rules, funds may be directed to third parties such as Non Profit Organizations (NPOs), businesses or other entities.

Variations are possible. For example, distribution rules may include conditional logic. For example, after a threshold number or amount of donations have been received, the distribution rules may change. Distribution rules may adjust based on activity levels of member within the group, or based on logic in the alliance agreement between groups.

System 200 may include one or more data storage repositories such as group profiles 220, user information 222, and/or content repository 230. Group profiles 220 includes one more profiles associated with a given group. As discussed with respect to FIG. 3, a group may include two or more like-minded users.

User information 222 includes information regarding a particular user, for instance, a user currently operating the system. The user information 222 may include parameters such as a user profile 224 of the current user, a history 225, a channel 226, and a community profile 227. The user profile 224 may include one or more attributes associated with a given user such as content preferences, topics of interest, associated groups, and so forth. History 225 may include one or more of the actions taken by a given user or content generated by the user.

The channel 226 refers to information used to connect a user to external communication channels such as social media channels, email, and text messaging systems.

Community profile 227 refers to audience characteristics associated with a user's Channels 226. Community profiles may characterize the entire audience as well as audience segments, and may also include profiles of individual users in the audience.

Content repository 230 is a storage system designed to manage, organize, and retrieve digital content. Examples of content that may be stored include news articles, stories, research reports, statistics, databases, etc. Different formats may be stored, for example, text documents (articles, PDFs, Word files), Images (JPEG, PNG, SVG), information containers, databases, videos and audio files, web pages. The content may have embedded metadata such as title, author, date created or modified, tags, a description, language information, and so forth. As discussed, content may be organized by topic and/or sub-topic.

Figure 3:
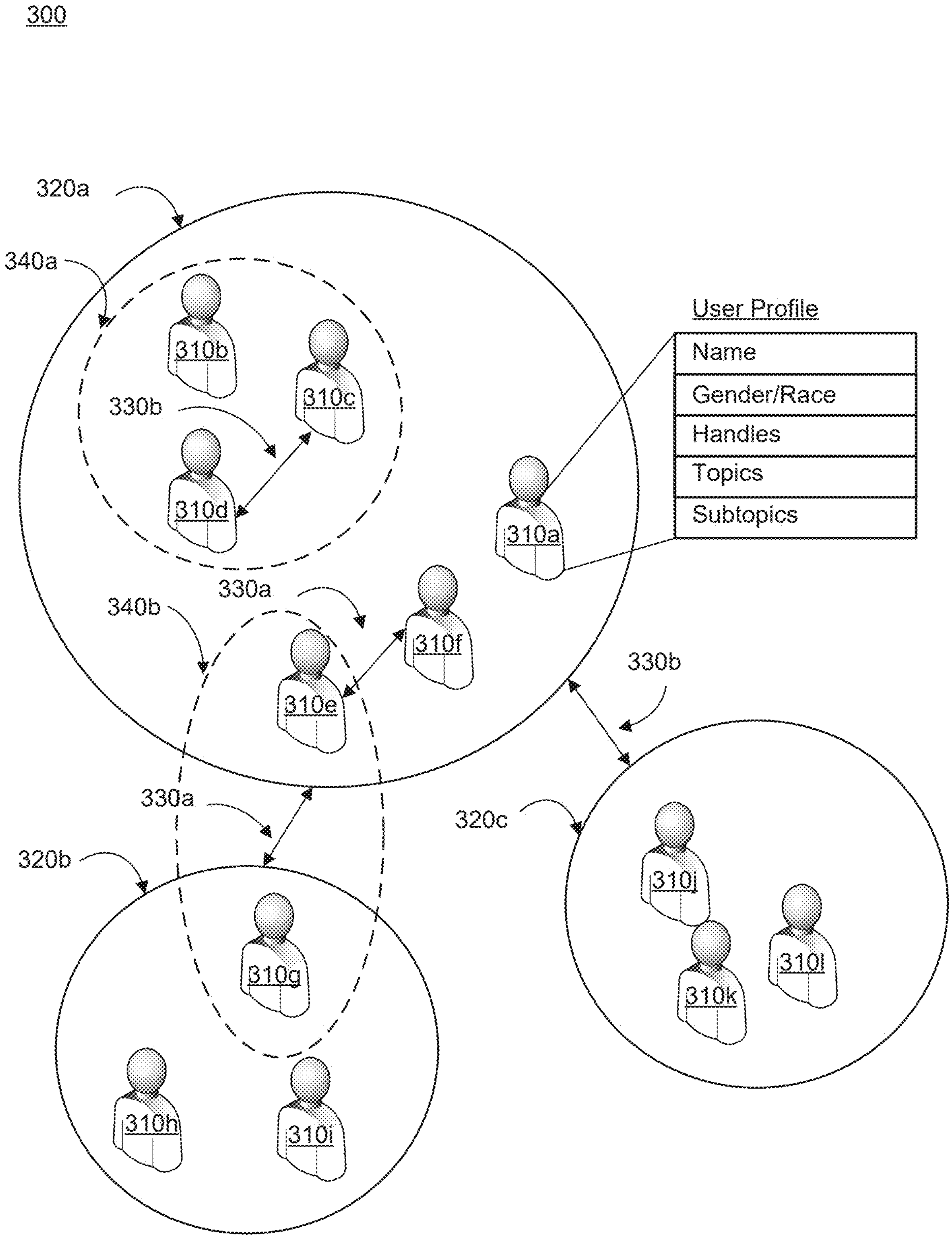
FIG. 3 depicts an example of relationships between users and groups for generating and communicating content, in accordance with an aspect of the present disclosure.

FIG. 3 depicts an example 300 of relationships between users and groups for generating and communicating content, in accordance with an aspect of the present disclosure. Example 300 illustrates various users 310*a*-3101 grouped into groups 320*a*-320*c*. As explained below, various relationships between users and/or groups are possible. For instance, users 310*a*-3301 may be part of one or more groups 320*a*-320*c*, be part of one or more sub-groups 340*a*-340*b*, and/or be related to other users 310*a*-3301. Further, one or more groups 320*a*-320*c* may be related by relations 330*a*-*b*. While specific numbers of users and groups are depicted for illustrative purposes, any number of users, groups, and relationships therebetween is possible.

Each user 310*a*-3301 has an associated user profile. A user profile is collection of data that describes a user's identity, preferences, behavior, and interactions. For illustrative purposes, a user profile of user 310*a* is depicted having a name, gender, race, social (media) handles, topics, and subtopics. A user profile may include additional demographic information such as an email address, a phone number, a date of birth, and/or a location. A user profile may include account information such as user identifier or name, account creation date, login history, and/or access permissions. A user profile may further include content-related information such as links to or copies of posts, comments, uploaded media, analytics associated with previous activity and so forth. Other elements are possible. A user profile may further include financial or payment information such as payment methods, purchase history, subscriptions, and/or receipts for payments made.

Users may be associated with groups based on any attribute, characteristic, or preference. As depicted, users 310*a*-310*f* are associated with group 320*a*, users 310*g*-310*i* are associated with group 320*b*, and users 310*j*-3101 are associated with group 320*b*. A given user 310*a*-3301 may be grouped automatically or by choice. For example, a group may be formed when a user identifies a particular topic that is important to them. As such, a user profile for a given user 310*a*-3301 may also include group information.

A given user 310*a*-1 may be associated with another users. For instance, as depicted, users 310*c* and 310*d* have an inter-user relationships 330*b*, and users 310*e* and 310*f* have an inter-user relationship 330*a*. As such a user profile may include relationships that exist between the associated user and other users.

Further, any group may have a relationship with one or more other groups. For example, as depicted group 320*a* and 320*b* have an inter-group relationships 340*a*, and group 320*a* and 330*c* have an inter-group relationship 340*b*.

In some cases, relationships between users and/or groups are based on rules. The rules may be based on common topics or sub-topics between the users of the groups. For instance, if users of a first group and users of a second group all identify "law" as an important issue, a relationship may be formed between the first and second groups. The rules may also include further rules related to handling messages, such as automatically reposting, rewriting in the styles of users in the group, distributing funds between the groups, and escalation processes for disputes.

FIG. 4 depicts an example of a user interface 400 used for generating and communicating content, in accordance with an aspect of the present disclosure. In the example depicted, a user provides a link to an article into user interface element ("element") 402 for analysis and configures content preferences via elements 404, 420, and 422 to customize generation of a content message, which may be previewed in element 424 prior to sharing.

As discussed, certain aspects involve generation and sharing of topically relevant content messages between user devices and/or on various platforms such as social networks. For example, if users within a group or with a common relationship are all interested in a given topic or sub-topic, a content message related to the topic or sub-topic may automatically be shared with the other users, for instance by being automatically posted under social media accounts associated with the other users.

As explained below, using user interface 400, a user may configure the output content messages, including an opening paragraph, a core message, supporting evidence, and any call to action or goal. Further, elements 426 and 428 include additional content suggestions curated by the system. If selected, these content suggestions may be shared via elements 404, 420, and 424.

Element 402 can be used to share source content such as documents, images, and so forth, with the content generation system 130. Element 402 can receive a link, for example, to a file, or a URL to the content. Once a user makes initial content available, the content may then be analyzed by the content generation system 130 and the user may further interact with the interface 400 via elements 404, 420, and 422 to generate and/or share additional content messages. As explained below, elements 404, 420, and 422 include various controls and parameters which may be configured or adjusted by a user operating a user device 170*a*-*n*.

As depicted, element 404 includes graphics 406, configuration boxes 408, slider 410, and output 412. But other elements may be present in some cases. Graphics 406 may depict one or more images related to the content. These images may be from the initial content provided by the user via element 402. Within element 404, the user may select from different initial content, e.g., content provided via element 402, and/or additional content curated by the system. The additional content may be associated with the initial content by having one or more topics in common.

The user may configure one or more settings via configuration boxes 408. Examples include, but are not limited to, "Rundown," "Advice," and "Sources." In the example depicted, a "Rundown" refers to a quick summary of the issues identified in the initial content; "Advice" refers to content that offers advice to the reader about how to take action relating to the issues; and "Sources" refers to the sources relied upon by the initial content. The user may configure slider 410 to adjust a length of the output content message. Examples include "brief" to "detailed." In response, content generation system 170 adjusts a length of the content, while maintaining a logical flow of information. Options selected in element 404 may affect options in elements 420, 422, and/or 424. Together, the options selected in elements 420, 422, and/or 424 may used to form an output definition in whole or in part (as discussed below with respect to FIG. 6).

In response to the configurations above, output 412 displays a resulting initial textual output. Element 420 enables a selection of a sharing channel for the generated content. As depicted, element 420 includes a selection of a social media network such as Instagram, Facebook, TikTok and Blue Sky. In response to selection of a social media channel, the structure of the message may change to reflect the elements selected or preferred for that channel. Element 420 may further include a selection of a goal. As depicted, the goals include "awareness," "donations," and "attend an event."

But other goals are possible. The selected goal may affect the content, the tone and/or length of the generated content. For example as the user continues through the flow, they may select, via element 420, a social media channel, a goal (e.g., awareness, donations, or votes) and a voice (e.g., neutral, concerned, anxious, or angry).

In this example, a user may select a campaign headline via element 420. In so doing, the user may override a headline of the initial content provided at element 402. For example, if an initial headline is "Protester arrested outside the Supreme Court," then a user may adjust the headline to "First Amendment Concerns outside the Court" etc. Selections in element 420 will affect which options are available via elements 422, 424.

Additional configuration options are possible. Additional options that may be available (not depicted) to affect content preferences include a selection of a persuasive personality type such as charismatic leader, logical analyst, passionate advocate, empathetic connector, pragmatic strategist, fearless challenger, diplomatic peacemaker, and resilient survivor. Custom personalities are configurable. Additional parameters which may be configured, for example, at a given level (e.g., low, medium, or high) include openness; conscientiousness; extraversion; agreeableness; neuroticism. Further, a user may configure the output content to comply with a particular personality template. Personality templates for different variations, rhetorical postures. Examples of personality templates include "openness," "conscientiousness," "extraversion," "agreeableness," and "neuroticism." Pre-defined style or rhetorical categories susceptible to parameterization from established schemes may be used. Furthermore, goals, and/or call to action types (e.g., donate, spread the word, go to a protest, contact representative) may affect content preferences.

Finally, element 424 depicts the draft content as configured by elements 404, 420, and 422. The user may therefore revise the content selections to adjust the text if desired. As discussed further below, the configurations of elements 404, 420, and 422 may affect configuration of one or more of the machine learning models. For example, the specific configurations of the elements may be used to generate an instruction prompt that is provided to the model.

Figure 5:
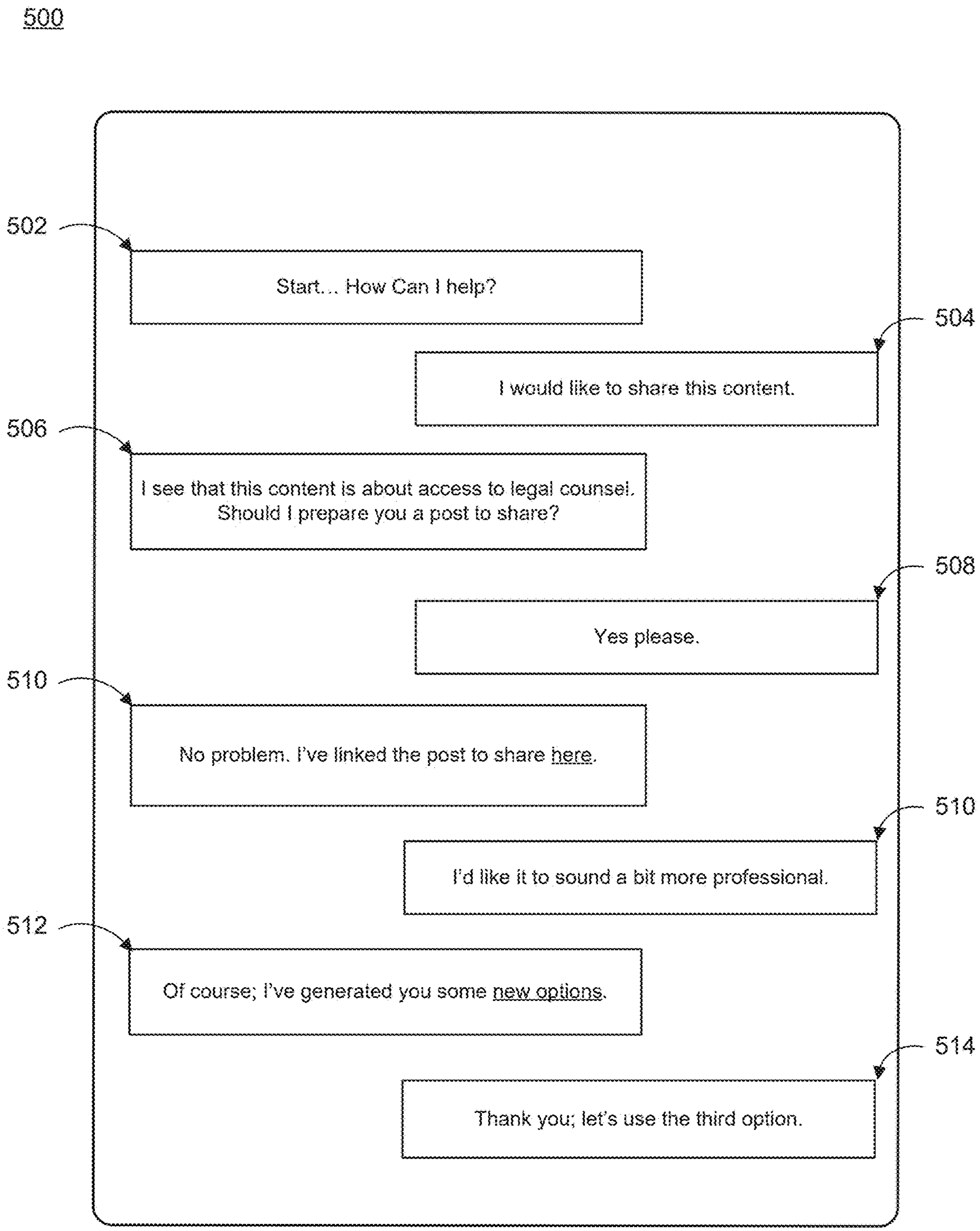
FIG. 5 depicts an example of an interaction with an autonomous agent for generating and communicating content, in accordance with an aspect of the present disclosure.

Further, a user may also invoke an autonomous agent via element 402, which facilitates interactions via natural language. By so doing, the user can issue commands and/or questions to the agent to further configure any of the parameters ordinarily configurable via elements 404, 420, and 422. FIG. 5 depicts one such example.

In some cases, the generated content message may be a script designed to be read by the user in an audio/video presentation such as on TikTok or YouTube. When a script is an element of the output definition 604, additional elements may include a URL or QR code.

FIG. 5 depicts an example of an interaction 500 with an autonomous agent for generating and communicating content, in accordance with an aspect of the present disclosure. As discussed, a user may interact with an autonomous agent in addition to or instead of interacting with user interface 400. The role of the agent is to help formulate messages, assess message performance, discover and develop alliances, monitor and update financial processing activity, coordinate activities within a group and/or set of alliances in accordance with any guardrails or security limits. In the example depicted, an autonomous agent interacts with the user. A model that implements the agent may be trained to perform a limited scope of functionality, for example, limited to performing the operations discussed herein.

Interaction 500 illustrates an example of an interaction between a user and an autonomous agent. Messages 502, 506, 510, and 512 are generated by the autonomous agent, whereas messages 504, 508, 510, and 514 are created by the user.

The autonomous agent may be powered by one or more machine learning models 150*a-n*. The autonomous agent may leverage a large language model trained on persuasive techniques and a dataset of analytics data. By using the analytics data, high quality data tagging information regarding individual messages and multi-message campaign effectiveness can be obtained.

Figure 6:
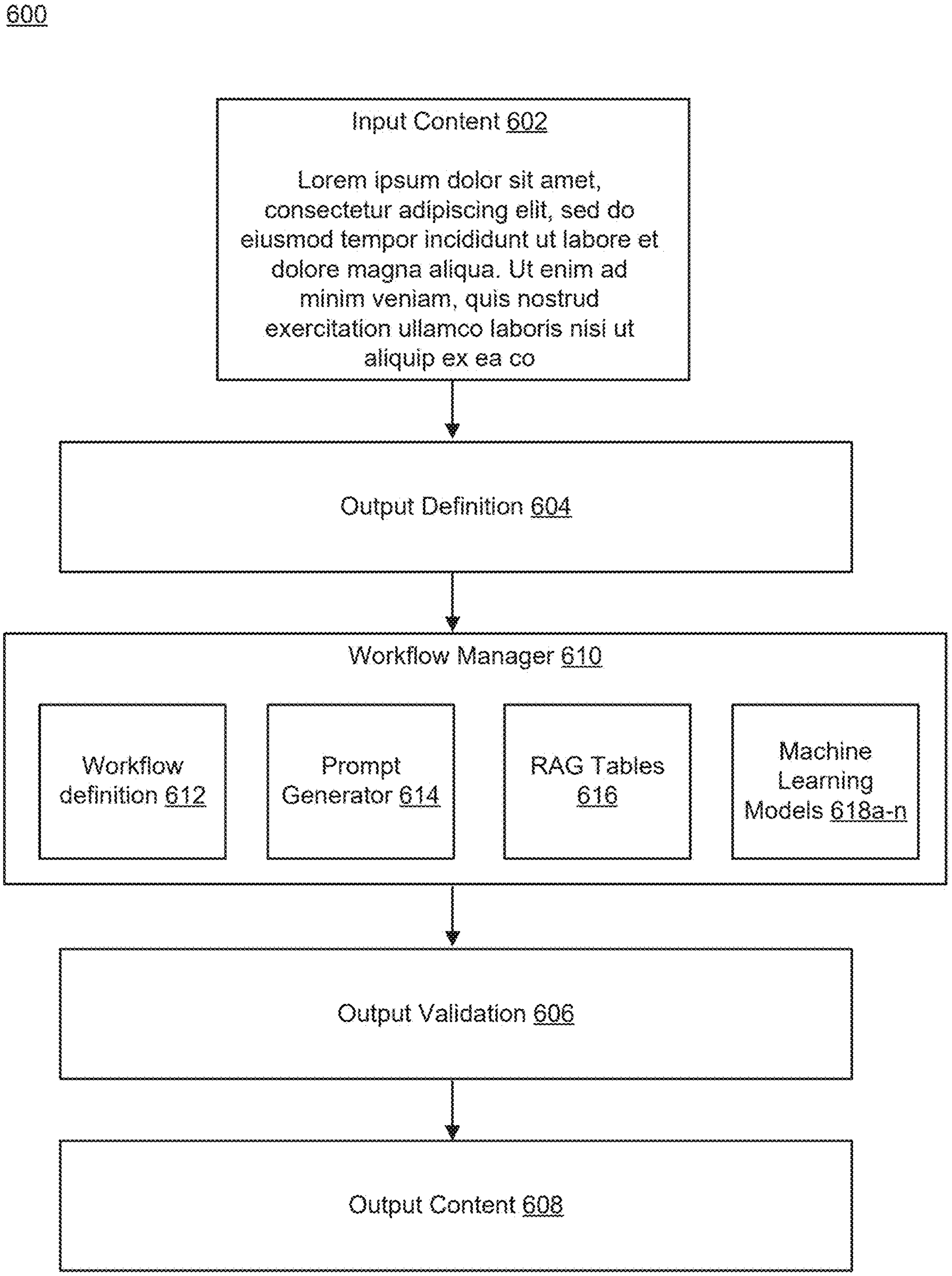
FIG. 6 depicts an example of a machine learning system for generating or communicating content, in accordance with an aspect of the present disclosure.

FIG. 6 depicts an example of a machine learning system 600 for generating or communicating content, in accordance with an aspect of the present disclosure. In the example depicted, system 600 accesses input content 602, and based on output definition 604, uses workflow manager 610 to generate output content, which is optionally validated by output validation 606, and transmitted as output content 608. Input content 602 may refer to the content displayed in interface 400, specifically output 412. Input content 602 may be further refined as discussed below.

Output definition 604 includes one or more configurations obtained based on a user's content preferences. For example, choices made by a user device with respect to input content, tone, length, structure, persuasive style, and so forth, are reflected in output definition 604. Output definition 604 is provided to workflow manager 610, which may use one or more machine learning techniques.

Workflow manager 610 includes workflow definition 612, prompt generator 614, Retrieval Augmented Generation (RAG) tables 616, and machine learning models 618*a-n*.

Workflow definition 612 instructs the system regarding the appropriate sequence of prompts and their relationship to one another. For example, a workflow definition may specify that the available choices for each element of a message should be presented to the user one at a time, and then subsequent element(s) generated allowing that choice to influence the generation of a subsequent element. Alternatively, it may specify that a message or portion of a message should be generated independently of other elements. Many permutations are possible.

Prompt generator 614 generates an instruction prompt to instruct the machine learning models 618*a-n*. Prompt design or engineering refers to a practice of designing and refining the prompts provided to a machine learning model such that the model produces useful, accurate, and context-appropriate responses. The prompt may strongly influence what the model produces. An example a structure of a prompt is: [Role/Persona]+[Task/Instruction]+[Format/Style]+[Constraints/Examples]. As discussed below, a prompt may include text and/or numerical parameters.

Various inputs may determine the prompt generated by prompt generator 614. For example, performance analytics may be incorporated such that the system improves over time. Performance analytics may include data indicating how often previous content was viewed, shared, and so forth. Prompt generation is discussed in more detail with respect to FIG. 7.

Retrieval Augmented Generation (RAG) tables 616 are created from information labelled with topics and/or subtopics within the content repository to facilitate the use of the content in content generation. In the context of generative artificial intelligence, a RAG table is part of a Retrieval-Augmented Generation (RAG) system designed to handle structured data, like tables, more effectively. The content generation system may use a RAG system.

The content generated by workflow manager 610 may be validated by output validation 606. Output validation involves comparing the generated output to the requested style, voice, format and other characteristics requested, as well as system guardrails for relevance, appropriateness of language, use of sources and consistency. Output content 608 is transmitted, for example, to an external system and/or another user device optionally according to one or more channel definitions. In some cases, an API and/or a headless browser may facilitate transmission of the content and/or collection of analytics.

Figure 7:
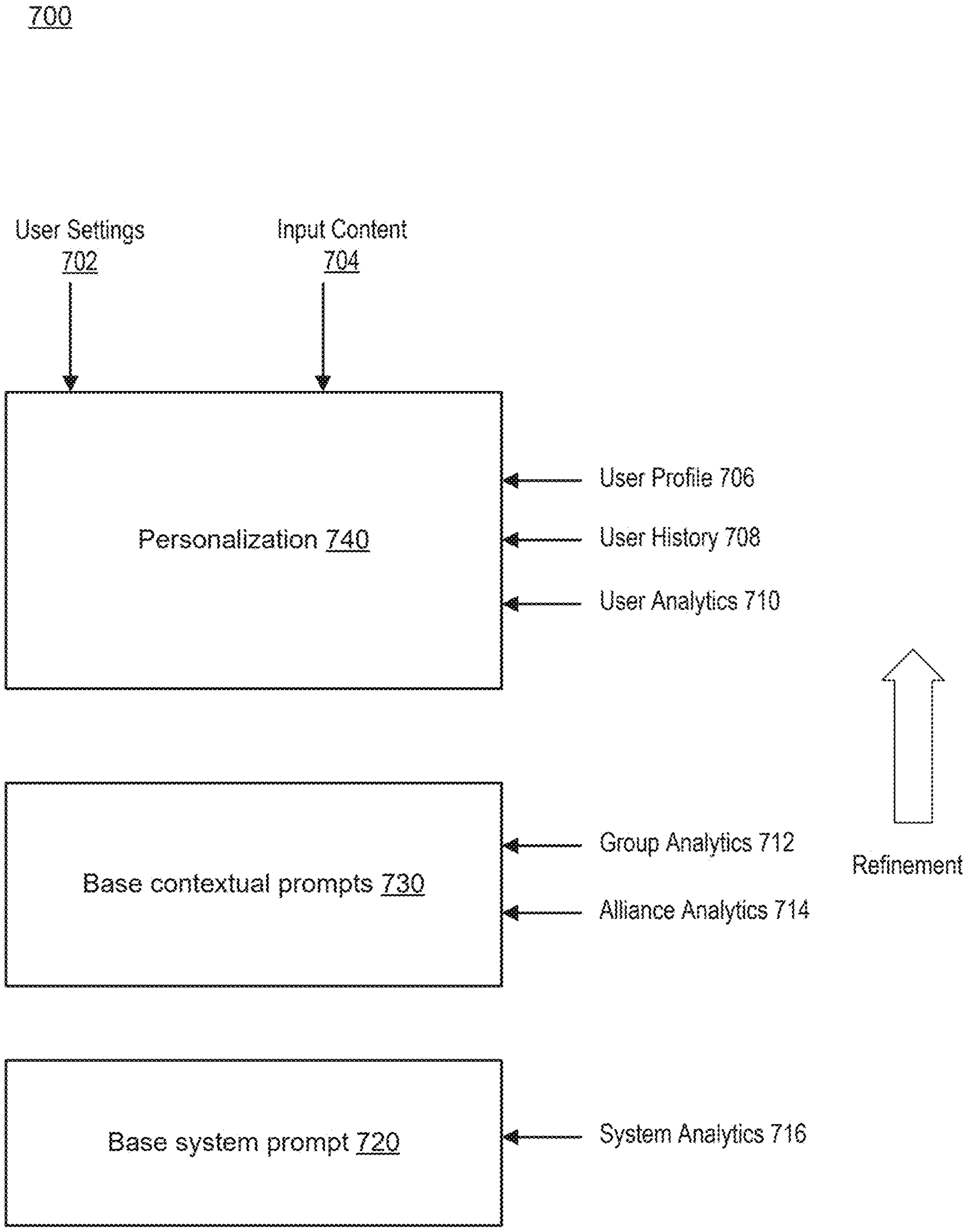
FIG. 7 depicts an example of a system for prompt generation for machine learning techniques, in accordance with an aspect of the present disclosure.

FIG. 7 depicts an example of a system 700 for prompt generation for machine learning techniques, in accordance with an aspect of the present disclosure. In the example depicted, an initial base system prompt 720 is generated for use with one or more machine learning models and is refined by one or more base contextual prompts 730 and finally by a personalization stage 740. System 700 facilitates easy adjustment of parameters within the prompt based on analytics, thereby improving system performance and/or content message effectiveness.

In an example, the base system prompt 720 is an initial prompt that has textual instructions and set of parameters. Each parameter may dictate an effect of a particular rhetorical and/or personality style. For example, given four rhetorical styles, each rhetorical style may have an associated parameter value (e.g., 0.3, 0.2, 0.2, and 0.3 respectively) A. The parameters may add up to a total such as one (1). As discussed below, the parameters may be adjusted based on the analytics. For example, if a particular content message (across a user, group, alliance and/or system) does not perform adequately, then the parameters may be adjusted accordingly on a subsequent iteration. Performance may be measured by metrics such as a frequency of a content message being shared, reposted, and/or "liked." Additional performance metrics may include characteristics of a target audience that received the content message (e.g., age, gender, etc.), timing of the content message (e.g., morning, afternoon, night, relative to a key current event, etc.), and/or a context associated with the target message.

For example, base system prompt 720 receives systems analytics 716. System analytics 716 may be defined by a specific topic and/or sub-topic of a content message. Base contextual prompt 730 receives group analytics 712 and alliance analytics 714 and further refines the base system prompt 720. The textual content of the prompt may be adjusted, e.g., augmented, or revised.

Personalization stage 740 then receives the prompt generated by base system prompt 720 and accesses user settings 702, input content 704, user profile 706, user history 708, and user analytics 710. User settings 702 may be derived from selections made by the user, for instance, via elements 404, 420, and 422 of user interface 400, and/or via messaging with the autonomous agent as discussed with respect to FIG. 5. Input content 704 refers to the content generated via user interface 400, specifically the content previewed in output 412. User profile 706 and user history 708 may refer to the user profile and history discussed with respect to system 200, specifically user profile and history 225.

System analytics 716, group analytics 712, alliance analytics 714, and user analytics 710 are obtained via analytics engine 214. User analytics 710 can include how content messages associated with a specific user are performing. Group analytics 712 may refer to analytics related to a group, as discussed with respect to FIG. 3. For instance, group analytics 712 can include how content messages associated with specific groups are performing. Alliance analytics 714 may refer to performance of content messages associated with alliances entered into between users and/or groups. System analytics 716 may be associated with every user and group associated with a particular topic and may form a starting point before further optimizations.

Figure 8:
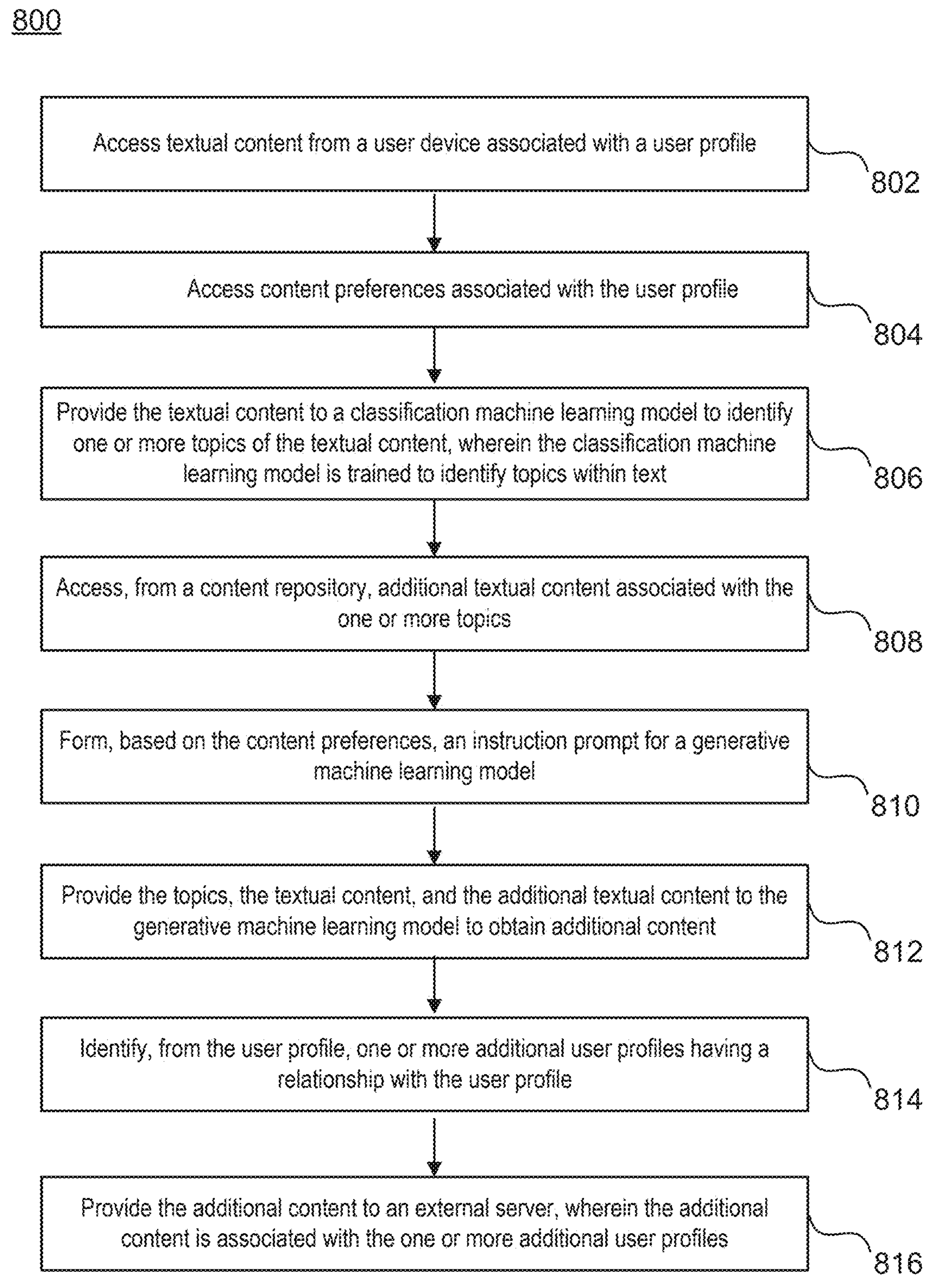
FIG. 8 depicts a flowchart illustrating an example of a method for generating and communicating content, in accordance with an aspect of the present disclosure.

FIG. 8 depicts a flowchart illustrating an example of a method for generating and communicating content, in accordance with an aspect of the present disclosure. Process 800 may be performed by system 1200 or any component thereof such as one or more processors. Process 800 includes various blocks including one or more operations. In some cases, a given operation may be skipped or repeated. Other variations are possible.

At block 802, the computing device (or any component thereof) may access textual content from a user device associated with a user profile.

At block 804, the computing device (or any component thereof) may access content preferences associated with the user profile.

At block 806, the computing device (or any component thereof) may provide the textual content to a classification machine learning model to identify one or more topics of the textual content. The classification machine learning model may be trained to identify topics within text.

At block 808, the computing device (or any component thereof) may access, from a content repository, supplementary textual content associated with the one or more topics.

At block 810, the computing device (or any component thereof) may form, based on the content preferences, an instruction prompt for a generative machine learning model. In an aspect, forming the instruction prompt is based on the user profile, a user history including previous content associated with the user device, and analytics data associated with performance of the previous content. In an aspect, an instruction prompt includes textual instructions and one or more parameters associated with one or more rhetorical styles. In an aspect, the content preferences include one or more of style, tone, audience, length, and/or objective.

At block 812, the computing device (or any component thereof) may provide the topics, the textual content, and the supplementary textual content to the generative machine learning model to obtain additional content.

At block 814, the computing device (or any component thereof) may identify, from the user profile, one or more additional user profiles having a relationship with the user profile.

At block 816, the computing device (or any component thereof) may provide the additional content to an external server. The additional content may be associated with the one or more additional user profiles.

In an aspect, the computing device (or any component thereof) may access a message from the user device, and identify an intent in the message. Forming the instruction prompt may be based on the intent. associated with the one or more additional user profiles.

In an aspect, the computing device (or any component thereof) may identify, from the one or more additional user profiles, one or more social media handles. The additional content is associated with the one or more social media handles.

FIGS. 9-10 depicts examples of user interfaces for use with generating and communicating content, in accordance with an aspect of the present disclosure. In some cases, the user interfaces depicted may be invoked on a mobile device.

FIG. 9 includes user interface 900, which may be used to facilitate financial transactions in connection with a shared content message. Financial transactions may also be initiated via various channels (e.g., social media channels). In the example depicted, a content message may be shared with a user, which causes the user interface 900 to subsequently appear on the user's device.

User interface 900 includes heading 902 and share panel 904. Share panel 904 includes a donation button 906 and "change amount" button 908 allows a user to change the size of the donation before sharing.

FIG. 10 includes user interface 1000, which may be used to share generated content. Relative to user interface 400 of FIG. 4, user interface 1000 is a reduced size interface with fewer controls. User interface 1000 includes share buttons 1004, a voice configuration selector 1106, an image pane 1008, a content preview pane 1010, and a post button 1012. A user may configure content options with buttons 1004, and 1006 and preview content in pane 1010, before sharing via button 1012. In some cases, as discussed, the content message may be in a form of a script such that a recipient may further personalize a message while maintaining the core content.

As discussed, certain aspects use machine learning. As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistic regression, random forest, gradient boosted machine, deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

While several of the examples herein involve certain types of machine learning, techniques according to this disclosure may be adapted to any suitable type of machine learning. Further, the examples above are illustrative only. The techniques and technologies of this disclosure may be adapted to any suitable activity.

Figure 11:
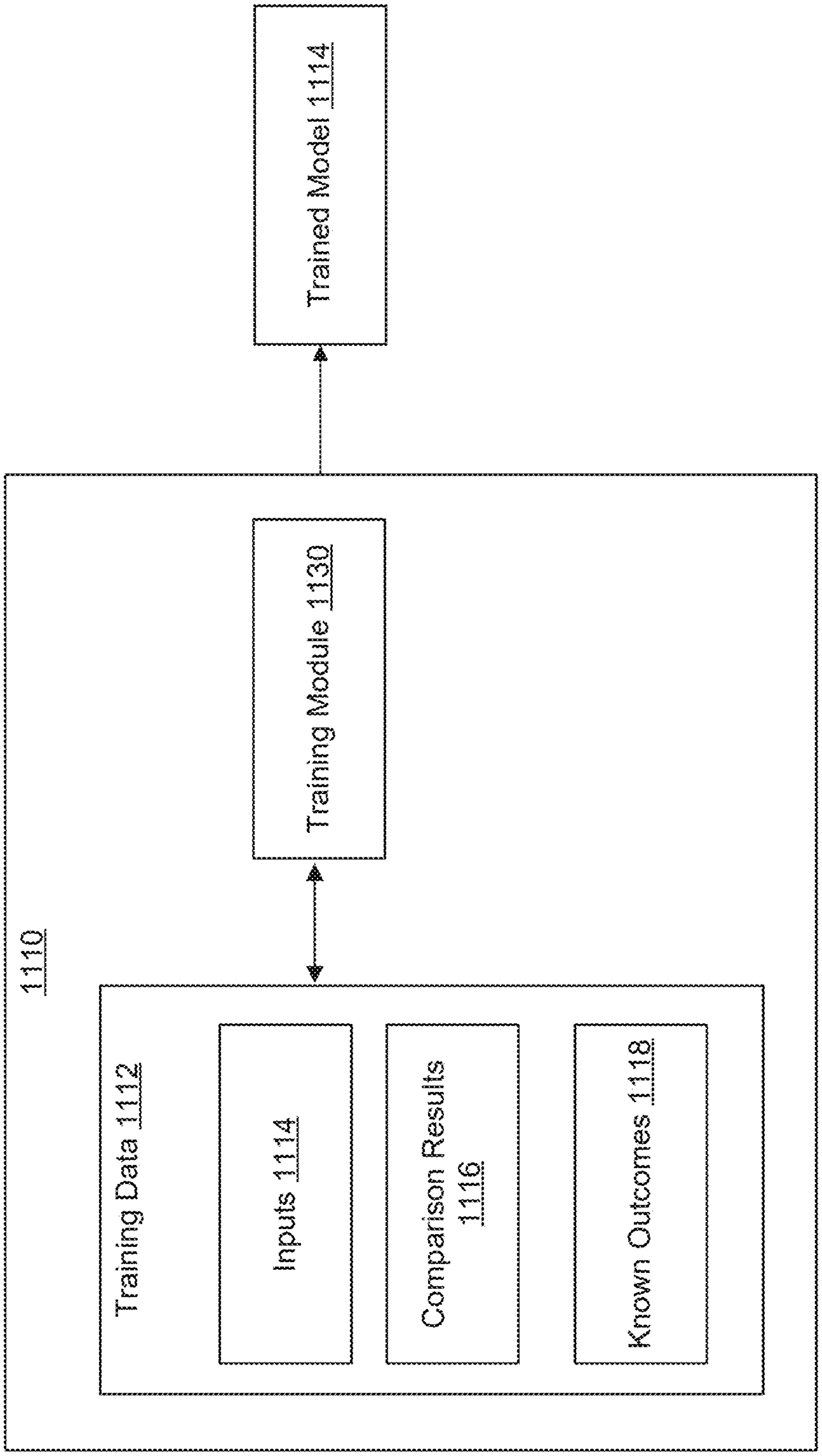
FIG. 11 depicts an example of a process for training a machine learning model, in accordance with an aspect of the present disclosure.

As discussed, various machine learning models described herein may be trained to perform operations such as classifying textual input, providing messaging services between users or between a user an autonomous agent, and/or generating content messages. FIG. 11 depicts an example of one suitable training approach.

FIG. 11 depicts an example of a process 1100 for training a machine learning model, in accordance with an aspect of the present disclosure. Training data 1112 may include one or more of inputs 1114 and known outcomes 1118 related to a machine learning model to be trained. The inputs 1114 may be from any applicable source including a component or set shown in the figures provided herein. Known outcomes 1118 may be included for machine learning models generated based on supervised or semi-supervised training. An unsupervised machine learning model might not be trained using known outcomes 1118. Known outcomes 1118 may include known or desired outputs for future inputs similar to or in the same category as inputs 1114 that do not have corresponding known outputs.

The training data 1112 may be provided to a training component 1130 that may apply the training data 1112 to generate a trained machine learning model 1150. According to an implementation, the training component 1130 may be provided comparison results 1116 that compare a previous output of the corresponding machine learning model to apply the previous result to re-train the machine learning model. The comparison results 1116 may be used by the training component 1130 to update the corresponding machine learning model. The training component 1130 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the process 1110 may be a trained machine learning model 1150.

A machine learning model disclosed herein may be trained by adjusting one or more weights, layers, and/or biases during a training phase. During the training phase, historical or simulated data may be provided as inputs to the model. The model may adjust one or more of its weights, layers, and/or biases based on such historical or simulated information. The adjusted weights, layers, and/or biases may be configured in a production version of the machine learning model (e.g., a trained model) based on the training. Once trained, the machine learning model may output machine learning model outputs in accordance with the subject matter disclosed herein. According to an implementation, one or more machine learning models disclosed herein may continuously update based on feedback associated with use or implementation of the machine learning model outputs.

FIG. 12 is a diagram illustrating an example of a computer system 1200, in accordance with an aspect of the present disclosure. Computer system 1200 is an example of any computing device used for an internal computer system, a remote computer system, a server, distributed system, data center, cloud-based system, or any component thereof.

Computer system 1200 may include one or more devices. For instance, computer system 1200 may include one or more of processor 1202, input/output device 1204, storage device 1208, memory 1210, communications interface 1216, and graphics processing unit (GPU) 1220. Each device may be connected via interface bus 1206, which is configured to communicate, transmit, and transfer data, controls, and commands among the various components of the computer system 1200.

Computer system 1200 includes at least one processor 1202 which is connected via bus 1206 to other system components. Examples of processor 1202 include, but are not limited to, a signal processor, micro controller, and a microprocessor. Computer system 1200 may also include GPUs 1220. The GPUs 1220 may be used to perform operations associated with one or more machine learning models.

Input/output device 1204 may provide connections to user devices such as a keyboard, screen, microphone, speaker, other input/output devices, and computing components such as graphical processing units, serial ports, parallel ports, universal serial bus, and other input/output peripherals. Further, input/output device 1204 may be configured to facilitate communication between the computer system 1200 and other computing devices over a communications network and include, for example, a network interface controller, modem, wireless and wired interface cards, antenna, and other communication peripherals.

Storage device 1208 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, an optical disk, and so forth. Storage device 1208 may include a computer-readable medium.

A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements.

Memory 1210 may include Read Only Memory (ROM) 1212 and/or Random Access Memory (RAM) 1214. In some cases, computer system 1200 can include a cache of high-speed memory connected directly with, in close proximity to, or integrated as part of processor 1202 (not depicted).

Communications interface 1216, which can generally govern and manage the user input and system output. The communication interface may perform or facilitate receipt and/or transmission wired or wireless communications using wired and/or wireless transceivers, Examples of wireless communication include WiFi®, Cellular (e.g., 3G, LTE, 4G, 5G, etc.), Bluetooth® and so forth.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

Various aspects are discussed below.

Aspect 1. A method for generating content, comprising: accessing textual content from a user device associated with a user profile; accessing content preferences associated with the user profile; providing the textual content to a classification machine learning model to identify one or more topics of the textual content, wherein the classification machine learning model is trained to identify topics within text; accessing, from a content repository, supplementary textual content associated with the one or more topics; forming, based on the content preferences, an instruction prompt for a generative machine learning model; providing the topics, the textual content, and the supplementary textual content to the generative machine learning model to obtain additional content; identifying, from the user profile, one or more additional user profiles having a relationship with the user profile; and providing the additional content to an external server, wherein the additional content is associated with the one or more additional user profiles.

Aspect 2. The method of Aspect 1, further comprising: identifying, from the one or more additional user profiles, one or more social media handles, wherein the additional content is associated with the one or more social media handles.

Aspect 3. The method of Aspect 1, wherein the content preferences include one or more of style, tone, audience, length, and/or objective.

Aspect 4. The method of Aspect 1, wherein forming the instruction prompt is based on the user profile, a user history including previous content associated with the user device, and analytics data associated with performance of the previous content.

Aspect 5. The method of Aspect 1, wherein the instruction prompt comprises textual instructions and one or more parameters associated with one or more rhetorical styles.

Aspect 6. The method of Aspect 5, further comprising updating the one or more parameters based on a metric of performance of the additional content.

Aspect 7. The method of Aspect 1, further comprising: accessing a message from the user device; and identifying an intent in the message, wherein forming the instruction prompt is based on the intent.

Aspect 8. The method of Aspect 1, further comprising transmitting the additional content to one or more additional user devices associated with the one or more additional user profiles.

Aspect 9. An apparatus for generating content, comprising: at least one memory; and at least one processor coupled to the at least one memory and configured to: access textual content from a user device associated with a user profile; access content preferences associated with the user profile; provide the textual content to a classification machine learning model to identify one or more topics of the textual content, wherein the classification machine learning model is trained to identify topics within text; access, from a content repository, supplementary textual content associated with the one or more topics; form, based on the content preferences, an instruction prompt for a generative machine learning model; provide the topics, the textual content, and the supplementary textual content to the generative machine learning model to obtain additional content; identify, from the user profile, one or more additional user profiles having a relationship with the user profile; and provide the additional content to an external server, wherein the additional content is associated with the one or more additional user profiles.

Aspect 10. The apparatus of Aspect 9, wherein the at least one processor is further configured to: identify, from the one or more additional user profiles, one or more social media handles, wherein the additional content is associated with the one or more social media handles.

Aspect 11. The apparatus of Aspect 9, wherein the content preferences include one or more of style, tone, audience, length, and/or objective.

Aspect 12. The apparatus of Aspect 9, wherein forming the instruction prompt is based on the user profile, a user history including previous content associated with the user device, and analytics data associated with performance of the previous content.

Aspect 13. The apparatus of Aspect 9, wherein accessing the textual content includes receiving the textual content via a user interface and wherein accessing the content preferences includes receiving the content preferences via the user interface.

Aspect 14. The apparatus of Aspect 9, wherein the at least one processor is further configured to: access a message from the user device; and identify and intent in the message, wherein forming the instruction prompt is based on the intent.

Aspect 15. The apparatus of Aspect 9, wherein the at least one processor is further configured to transmit the additional content to one or more additional user devices associated with the one or more additional user profiles.

Aspect 16. A non-transitory computer-readable medium is provided that has stored thereon instructions that, when executed by one or more processors, cause the one or more processors to: access textual content from a user device associated with a user profile; access content preferences associated with the user profile; provide the textual content to a classification machine learning model to identify one or more topics of the textual content, wherein the classification machine learning model is trained to identify topics within text; access, from a content repository, supplementary textual content associated with the one or more topics; form, based on the content preferences, an instruction prompt for a generative machine learning model; provide the topics, the textual content, and the supplementary textual content to the generative machine learning model to obtain additional content; identify, from the user profile, one or more additional user profiles having a relationship with the user profile; and provide the additional content to an external server, wherein the additional content is associated with the one or more additional user profiles.

Aspect 17. The non-transitory computer-readable medium of Aspect 16, wherein when executed by the one or more processors, the instructions cause the one or more processors to: identify, from the one or more additional user profiles, one or more social media handles, wherein the additional content is associated with the one or more social media handles.

Aspect 18. The non-transitory computer-readable medium of Aspect 16, wherein the content preferences include one or more of style, tone, audience, length, and/or objective.

Aspect 19. The non-transitory computer-readable medium of Aspect 16, wherein forming the instruction prompt is based on the user profile, a user history including previous content associated with the user device, and analytics data associated with performance of the previous content.

Aspect 20. The non-transitory computer-readable medium of Aspect 16, wherein accessing the textual content includes receiving the textual content via a user interface and wherein accessing the content preferences includes receiving the content preferences via the user interface. 21.

What is claimed is:

1. A method for generative machine learning, comprising:

invoking a user interface including a plurality of elements;

receiving, via the user interface, textual content from a user device associated with a user profile;

rendering, in a first element of the plurality of elements, first image content associated with the textual content;

receiving, via the user interface, content preferences associated with the user profile, wherein the content preferences indicate a rhetorical style;

providing the textual content to a classification machine learning model to identify a topic of the textual content, wherein the classification machine learning model is trained to identify topics within text;

obtaining, from a content repository, supplementary textual content including one or more content items associated with the identified topic;

rendering the supplementary textual content in a second element of the plurality of elements;

identifying a group of user profiles associated with the identified topic, wherein the group of user profiles includes the user profile;

obtaining group analytics relating to performance of content items associated with the user profile and the identified topic;

forming, based on the content preferences and the group analytics, an instruction prompt for a generative machine learning model;

providing the identified topic, the textual content, the instruction prompt, and the supplementary textual content to the generative machine learning model to obtain additional content;

providing the additional content to an external server, wherein when the additional content is received by the external server, the additional content is associated with one or more additional user profiles; and updating the generative machine learning model based on user analytics associated with performance of the additional content.

2. The method of claim 1, further comprising:

identifying, from the one or more additional user profiles, one or more social media handles, wherein the additional content is associated with the one or more social media handles.

3. The method of claim 1, wherein the content preferences include one or more of: style, tone, audience, length, type, and/or or objective.

4. The method of claim 1, wherein the instruction prompt includes textual instructions and one or more parameters associated with one or more rhetorical styles.

5. The method of claim 1, further comprising:

accessing a message from the user device; and identifying an intent in the message, wherein forming the instruction prompt is based on the intent.

6. The method of claim 1, further comprising causing transmission of the additional content to one or more additional user devices associated with the one or more additional user profiles.

7. The method of claim 1, further comprising processing user analytics relating to performance of one or more additional content items associated with the user profile.

8. The method of claim 1, further comprising identifying a group profile associated with the user profile, wherein the group profile includes one or more of a group description, a history of past group performance, group channels, or a group community profile.

9. The method of claim 1, wherein the performance of the additional content includes a frequency of viewing of the additional content.

10. The method of claim 1, wherein the instruction prompt includes a role, an instruction, and one or more parameters, wherein the one or more parameters specify an effect of the rhetorical style on the additional content.

11. An apparatus for generating content, comprising:

at least one memory; and at least one processor coupled to the at least one memory and configured to:

invoke a user interface including a plurality of elements;

receive, via the user interface, textual content from a user device associated with a user profile;

render, in a first element of the plurality of elements, first image content associated with the textual content;

access content preferences associated with the user profile, wherein the content preferences indicate a rhetorical style;

provide the textual content to a classification machine learning model to identify a topic of the textual content, wherein the classification machine learning model is trained to identify topics within text;

obtain, from a content repository, supplementary textual content including one or more content items associated with the identified topic;

render the supplementary textual content in a second element of the plurality of elements;

identify a group of user profiles associated with the identified topic, wherein the group of user profiles includes the user profile;

obtain group analytics relating to performance of content items associated with the user profile and the identified topic;

form, based on the content preferences and the group analytics, an instruction prompt for a generative machine learning model;

provide the identified topic, the textual content, the instruction prompt, and the supplementary textual content to the generative machine learning model to obtain additional content;

provide the additional content to an external server, wherein when the additional content is received by the external server, the additional content is associated with one or more additional user profiles; and update the generative machine learning model based on user analytics associated with performance of the additional content.

12. The apparatus of claim 11, wherein the at least one processor is further configured to:

identify, from the one or more additional user profiles, one or more social media handles, wherein the additional content is associated with the one or more social media handles.

13. The apparatus of claim 11, wherein the content preferences include one or more of: style, tone, audience, length, type, or objective.

14. The apparatus of claim 11, wherein the at least one processor is further configured to:

access a message from the user device; and identify an intent in the message, wherein forming the instruction prompt is based on the intent.

15. The apparatus of claim 11, wherein the at least one processor is further configured to cause transmission of the additional content to one or more additional user devices associated with the one or more additional user profiles.

16. The apparatus of claim 11, wherein the at least one processor is further configured to process user analytics relating to performance of one or more additional content items associated with the user profile.

17. A non-transitory computer-readable medium is provided that has stored thereon instructions that, when executed by one or more processors, cause the one or more processors to:

invoke a user interface including a plurality of elements;

receive, via the user interface, textual content from a user device associated with a user profile;

render, in a first element of the plurality of elements, first image content associated with the textual content;

receive, via the user interface, content preferences associated with the user profile, wherein the content preferences indicate a rhetorical style;

provide the textual content to a classification machine learning model to identify a topic of the textual content, wherein the classification machine learning model is trained to identify topics within text;

obtain, from a content repository, supplementary textual content, wherein obtaining includes identifying one or more content associated with the one or more topics;

render the supplementary textual content in a second element of the plurality of elements;

identify a group of user profiles associated with the identified topic, wherein the group of user profiles includes the user profile;

obtain group analytics relating to performance of content items associated with the user profile and the identified topic;

form, based on the content preferences and the group analytics, an instruction prompt for a generative machine learning model;

provide the identified topic, the textual content, the instruction prompt, and the supplementary textual content to the generative machine learning model to obtain additional content;

provide the additional content to an external server, wherein when the additional content is received by the external server, the additional content is associated with one or more additional user profiles; and update the generative machine learning model based on user analytics associated with performance of the additional content.

18. The non-transitory computer-readable medium of claim 17, wherein the content preferences include one or more of: style, tone, audience, length, type, or objective.

19. The non-transitory computer-readable medium of claim 17, wherein when executed by the one or more processors, the instructions are further configured to cause the one or more processors to process user analytics relating to performance of one or more additional content items associated with the user profile.

* * * * *